Figure 16:
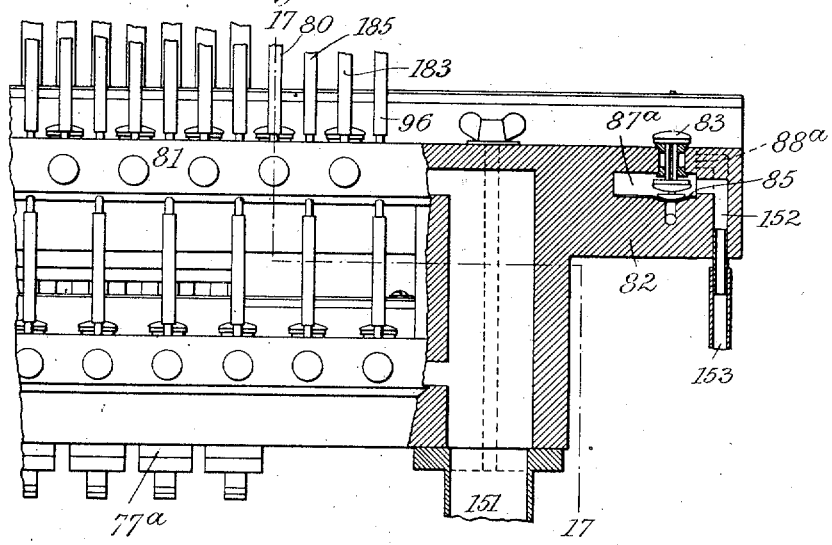

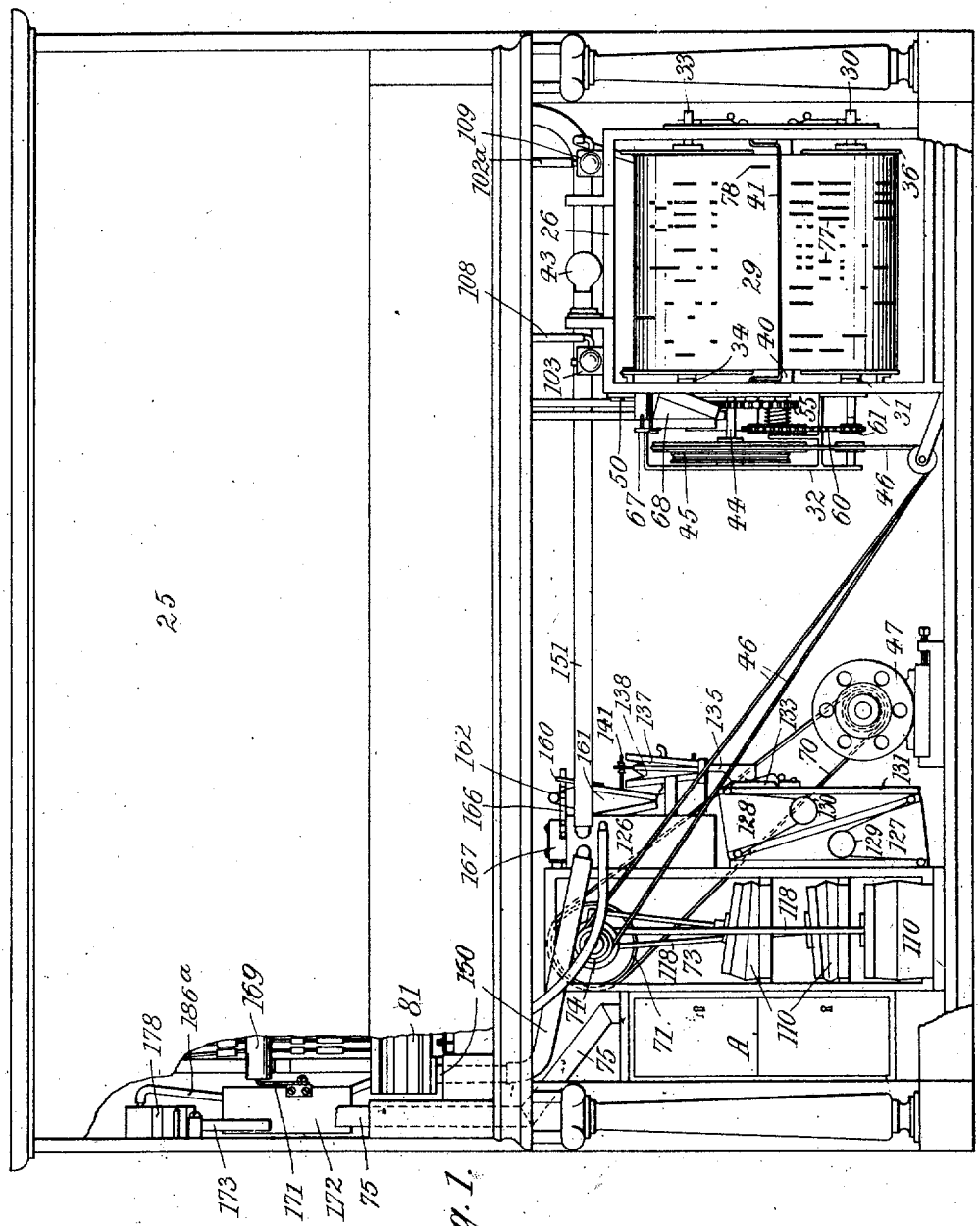

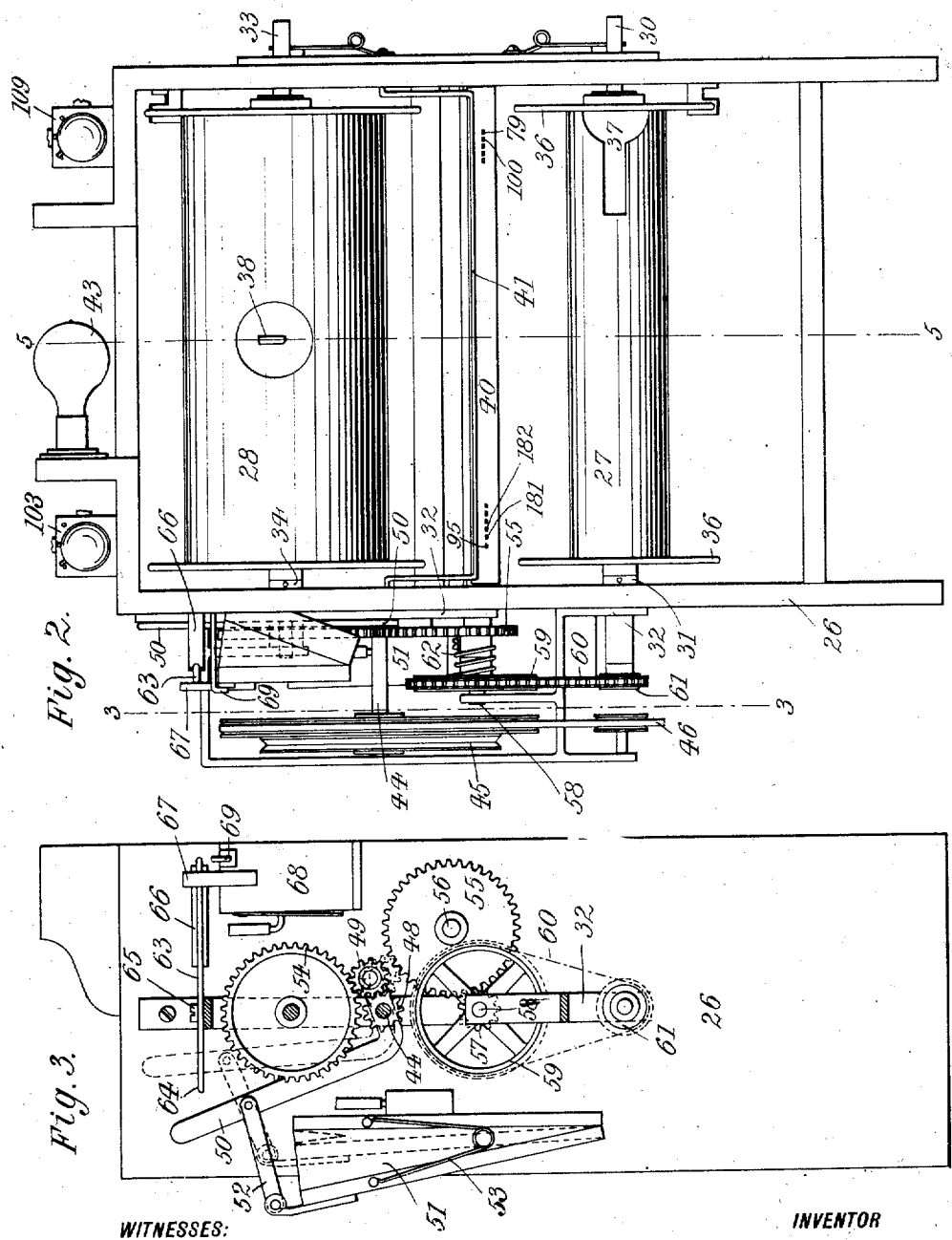

A. J. HOBART.
AUTOPNEUMATIC PIANO.
APPLICATION FILED MAR. 21, 1910.
989,152.
Patented Apr. 11, 1911.
7 SHEETS—SHEET 3.
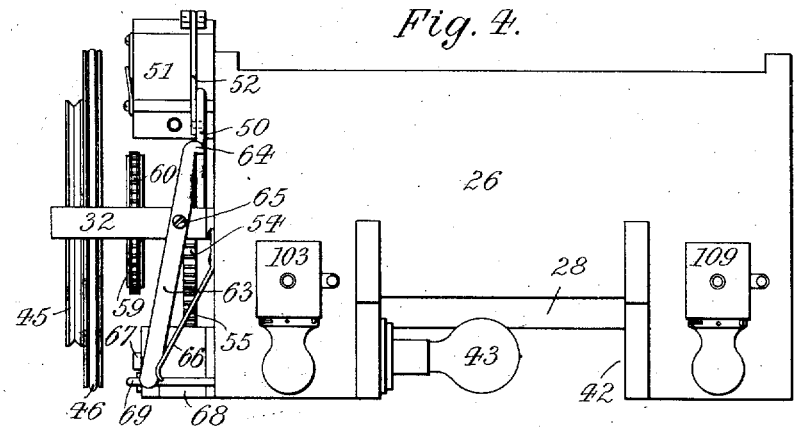
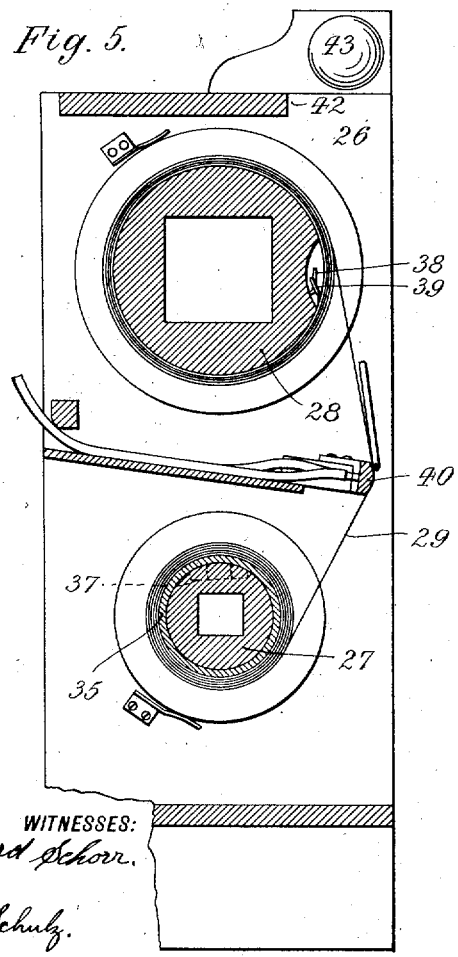
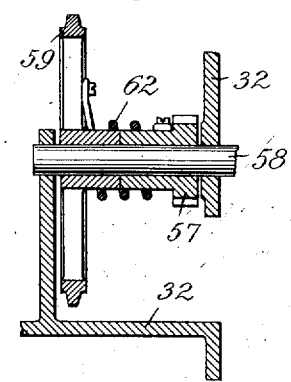
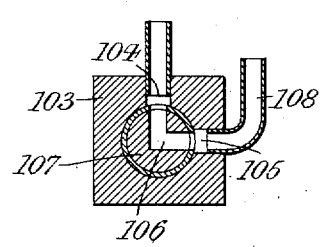
WITNESSES:
Edward Schorr.
W. R. Schulz.
INVENTOR
Adam J. Hobart
BY
Briesen & Jumper
ATTORNEYS

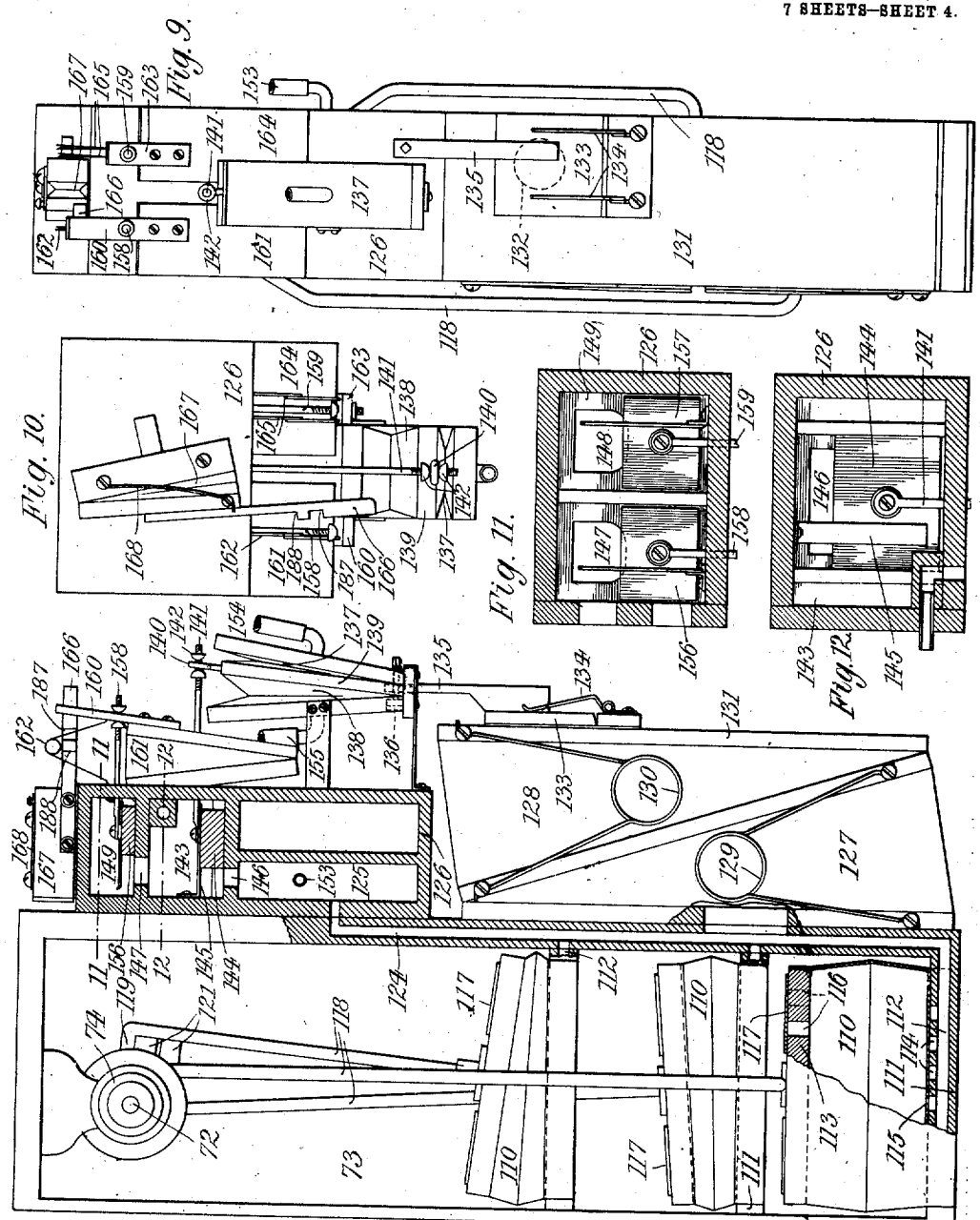

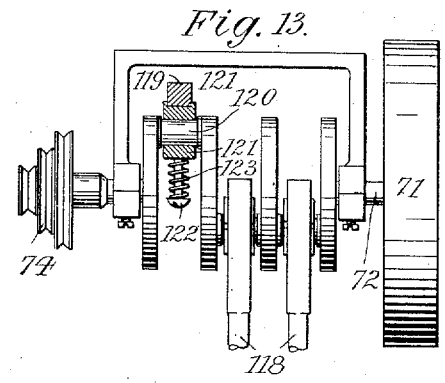
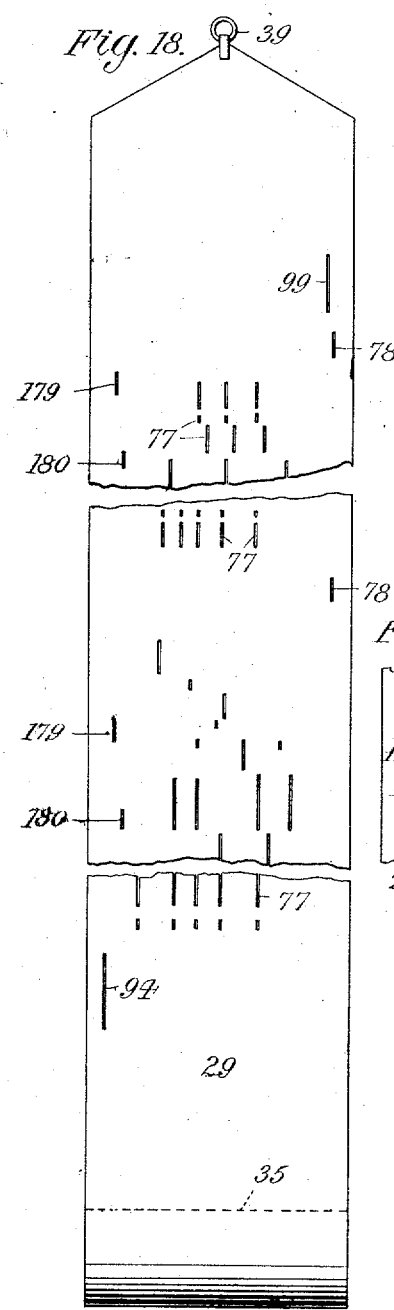
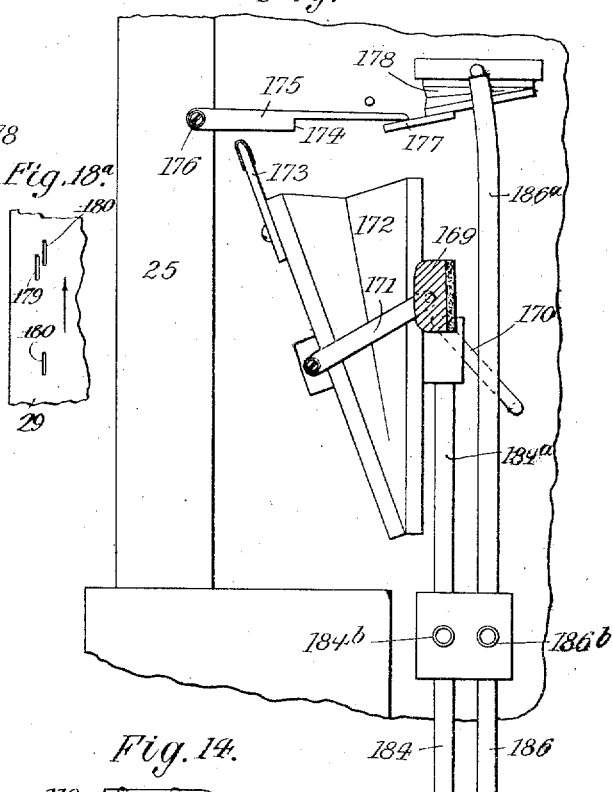
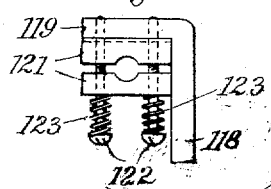

A. J. HOBART.
AUTOPNEUMATIC PIANO.
APPLICATION FILED MAR. 21, 1910.

989,152.

Patented Apr. 11, 1911.

7 SHEETS—SHEET 6.

WITNESSES:
Edward Schorr.
W. R. Schulz.

INVENTOR
Adam J. Hobart
BY
Briesen & Zumper
ATTORNEYS

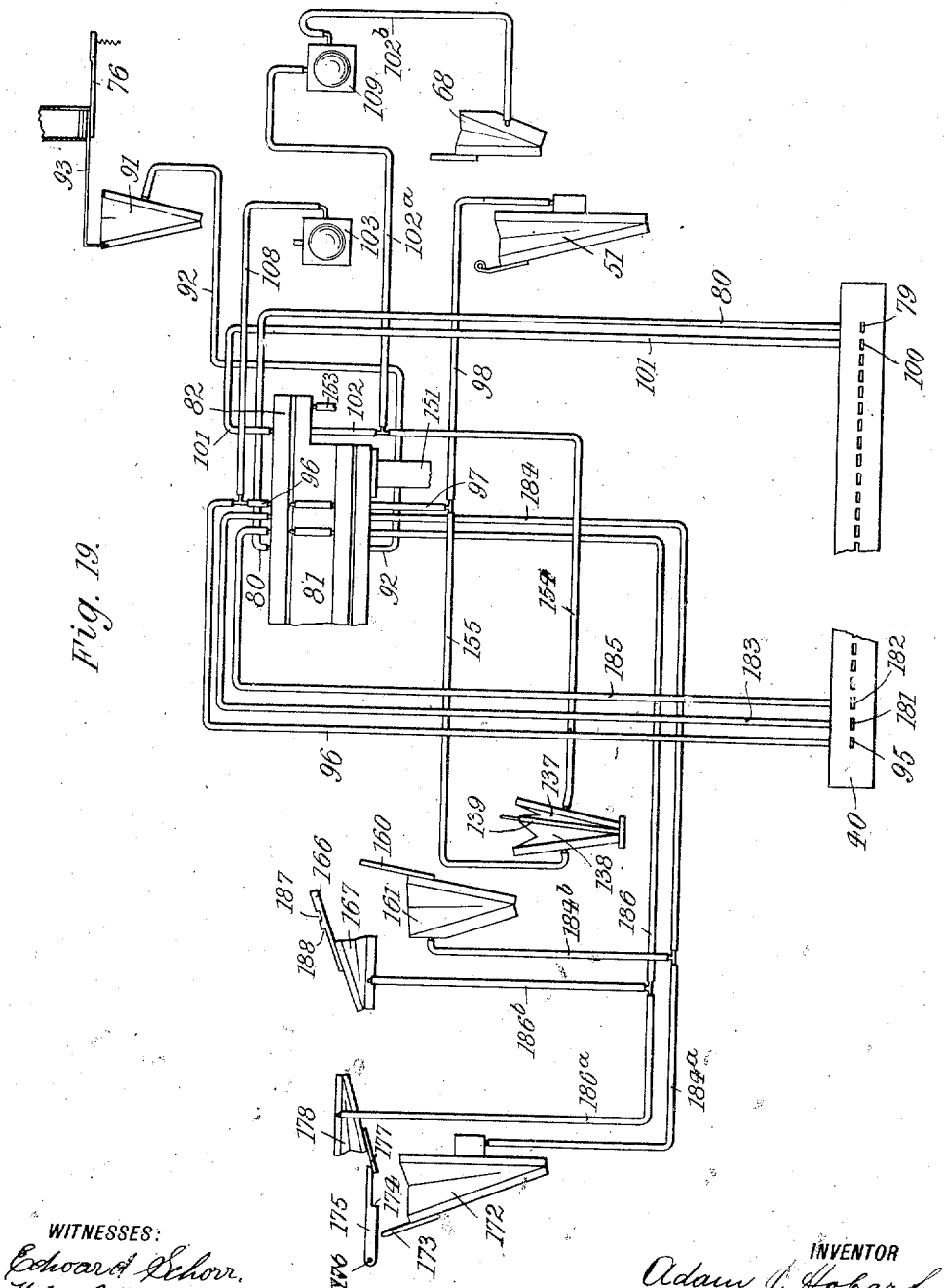

UNITED STATES PATENT OFFICE.

ADAM J. HOBART, OF ST. JOHNSVILLE, NEW YORK, ASSIGNOR TO F. ENGELHARDT & SONS, OF ST. JOHNSVILLE, NEW YORK, A FIRM.

AUTOPNEUMATIC PIANO.

989,152.  Specification of Letters Patent.  Patented Apr. 11, 1911.

Application filed March 21, 1910. Serial No. 550,675.

*To all whom it may concern:*

Be it known that I, ADAM J. HOBART, a citizen of the United States, residing at St. Johnsville, county of Montgomery, State of New York, have invented new and useful Improvements in Autopneumatic Pianos, of which the following is a specification.

This invention relates to improvements in autopneumatic pianos and more particularly to that class thereof which is coin-controlled. With the constructions hitherto used, instruments of this class were operated by means of endless records, each comprising a series of different tunes. As such endless records, for obvious reasons, cannot be coiled upon rollers, but must be loosely folded within a box of limited capacity which also contains the feed and guide rollers, the number of airs carried by a single record was practically limited. More particularly is this so, because an excessive number of folds would cause the record to become entangled during handling and an interchange of the records to be greatly impeded. In order to overcome all these difficulties, applicant uses a record which is wound upon a suitable core or delivery roller and which may be of any length desired, so as to embody a large number of various pieces of music. From this roller the record is intermittently transferred upon a receiving drum, while the airs contained by said record are consecutively rendered. The rendition of each individual air is caused by the introduction of a coin into a suitable coin box, while the record is automatically arrested after the completion of such air. After finishing the last air of the record, the latter is automatically rewound upon the delivery roller until it occupies the position for repeating the first air, whereupon it is arrested, to play said first air upon the introduction of a coin. Further means are provided for completely winding the record upon the delivery roller and unhooking it from the receiving roller, so that it is in condition to be exchanged. Means are further provided for rewinding the record at any desired moment, so as to permit the introduction of a new record before all the airs of the first record have been rendered.

The invention further comprises a series of novel features which are pointed out in the appended claims.

Figure 17:
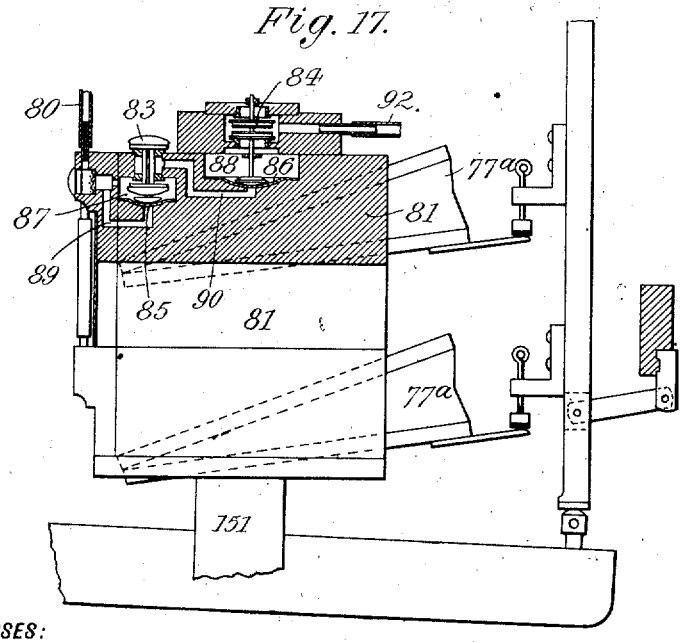

In the accompanying drawings: Figure 1 is a front view of a piano embodying my invention, the case being partly broken away; Fig. 2 a front elevation of the record actuating means; Fig. 3 a vertical section on line 3—3, Fig. 2, with some of the parts omitted; Fig. 4 a plan of Fig. 2; Fig. 5 a vertical section on line 5—5, Fig. 2; Fig. 6 a detail of the drum driving gear; Fig. 7 a cross section through one of the air valves; Fig. 8 a sectional front elevation of the vacuum producing and controlling means; Fig. 9 a side view thereof; Fig. 10 a plan of Fig. 8; Fig. 11 a horizontal section on line 11—11, Fig. 8; Fig. 12 a similar section on line 12—12, Fig. 8; Fig. 13 a detail of the crank shaft and coöperating parts for actuating the vacuum pumps; Fig. 14 a detail of one of the connecting rods; Fig. 15 a side view of the means for setting the hammer rail; Fig. 16 a front elevation, partly in section, of the pneumatic action; Fig. 17 a vertical section on line 17—17, Fig. 16; Fig. 18 shows part of record; Fig. 18ª illustrates part of the record provided with perforations for playing "pianissimo," and Fig. 19 is a diagram showing the tubing between the several pneumatics.

Within the casing 25 of an autopneumatic piano or similar instrument is mounted a frame 26 that contains the delivery roller 27 and the receiving drum 28 of the perforated double-ended music sheet or record 29. One end of roller 27 is loosely mounted on an axially displaceable spring-influenced pintle 30, while its other end engages a socket 31 which is journaled in an extension frame 32 secured to frame 26. In like manner, one end of drum 28 is loosely mounted on an axially displaceable spring-influenced pintle 33, while its other end engages a socket 34 journaled in frame 32. By withdrawing pintles 30 and 33, roller 27 and drum 28 may be removed from frame 32, as usual with instruments of this class.

I prefer to secure one end of record 29 to a tube 35 of card board or similar material. This tube is adapted to be slipped over roller 27, for which purpose one of its flanges 36 is removable. Tube 35 has a suitable inner projection which is received within a corresponding cavity 37 of roller 27, to be positively taken along during the rotation of the latter.

Drum 28 is provided with a hook 38 which is adapted to be engaged by a ring 39 secured to the free end of record 29. Intermediate roller 27 and drum 28 is arranged a tracker bar 40, the record being held against said bar during its travel by a gravity bail 41 loosely hung in frame 26. At its top, frame 26 is partly cut away as at 42 to permit the light of an incandescent lamp 43 to be thrown upon the rollers, thereby facilitating the exchange of the records.

Roller 27 and drum 28 are adapted to be alternately coupled to a driving shaft 44 journaled in frame 32 and carrying a stepped pulley 45. The latter is partly embraced by a rope 46 which receives motion from an electromotor 47 in manner hereinafter described. To shaft 44 is keyed a pinion 48 permanently meshing into a pinion 49 which is carried by one arm of a two-arm lever 50. The latter turns loosely on shaft 44 and is operated by rewinding bellows 51, the movable board of which is, by link 52, connected to said lever. Normally bellows 51 are expanded by spring 53, in which condition of the bellows, pinion 49 engages a toothed wheel 54 firmly secured to the socket 34 of drum 28. In this way motion may be transmitted from driving shaft 44 to drum 28 for advancing the record whenever it is desired to render a piece of music.

For rewinding the record, bellows 51 are collapsed in manner hereinafter described, whereby lever 50 is swung into the position indicated by dotted lines in Fig. 3. In this position, pinion 49 is disengaged from toothed wheel 54 and meshes into a toothed wheel 55 loosely turning on a pintle 56. Gear wheel 55 engages a pinion 57 which loosely embraces a shaft 58 hung in frame 32. Upon shaft 58 is journaled a sprocket wheel 59 which is, by chain 60, connected to a sprocket wheel 61 secured to socket 31. I prefer to employ a spring 62 for transmitting motion from pinion 57 to sprocket wheel 59, which spring must first be placed under a certain tension before starting the rewinding operation, so as to avoid shocks and to insure a uniform rewinding of the record. Spring 62 is shown to encircle the hubs of pinion 57 and sprocket wheel 59, one end of the spring being secured to the pinion-hub, while its other end is secured to the wheel.

During rewinding, pinion 49 and wheel 55 are held in permanent engagement by a lever 63, the hook-shaped end 64 of which is adapted to engage lever 50. Lever 63 is fulcrumed at 65 and is engaged by a spring 66 that forces the lever against an arm 67 projecting upwardly from the movable board of trip bellows 68, the outward movement of said board being limited by a fixed stop 69. Bellows 68 are normally expanded, so that hook 64 is projected into the path of lever 50. Upon the collapse of bellows 51, lever 50 will thus, by hook 64, be retained in its advanced position. After the rewinding has been completed, bellows 68 are collapsed in manner hereinafter described, thereby withdrawing hook 64 from lever 50. Spring 53 is now free to expand bellows 51, thereby swinging pinion 49 away from gear wheel 55 and into engagement with gear wheel 54. After the driving axle has thus been coupled to the receiving drum, the instrument is arrested before starting the rendition of the first air embodied in the record. The means for arresting the instrument will be described further below, it being preferred to first disclose the means for starting and operating the same.

Electromotor 47 is, by rope 70 and pulley 71, connected to the crank shaft 72 of the vacuum pump 73, while a stepped pulley 74, keyed to shaft 72, is engaged by rope 46. It will thus be seen that upon the start of electromotor 47, the vacuum pump 73, as well as driving shaft 44, are set in motion. Electromotor 47 is started by the introduction of a coin into a coin-slot which communicates with a coin-chute 75. This chute delivers the coin upon the free end of a switch lever 76 contained in a box A, thereby depressing the same and closing the electromotor circuit.

It will be seen that after the introduction of a proper coin, the circuit of electromotor 47 will be closed, to start the instrument. After one air has been completely rendered, the electromotor circuit is automatically opened to arrest pump 73 and record 29. The means for producing this result are as follows: In addition to the perforations 77, which actuate the tune producing bellows 77ᵃ, the record is provided at the end of each individual air, (excepting the last air), with an additional perforation 78 which is thus placed at the head of the succeeding air and controls duct 79 of tracker bar 40. The latter is, by tube 80, connected to valve box 81 provided with an extension 82, and containing a primary valve 83 and a secondary valve 84. Briefly stated, these valves rest upon diaphragms 85, 86 contained in vacuum chambers 87, 88 respectively. When perforation 78 registers with duct 79, air will be admitted below diaphragm 85 through tube 80 and duct 89, so that the diaphragm will raise valve 83, thereby admitting air through duct 90 to the lower side of diaphragm 86, which, in turn, will raise valve 84. In this way bellows 91 will be connected to vacuum chamber 88 through a tube 92, thus collapsing the bellows. This collapse is utilized for advancing a coin ejector 93 to throw the coin which rested upon lever 76 during the rendition of the piece of music, from said lever, thereby causing the latter to open the switch of the electromotor circuit, and arrest the instrument. Upon the introduction of additional coins, the operation described will be repeated until the last air has been rendered. At the end of said last music piece, a perforation 94 is provided in record 29 which coöperates with a duct 95 of tracker bar 40. Duct 95 is, by tube 96, operatively connected with a set of primary and secondary valves, (which equal in all respects, valves 83 and 84), the secondary valve connecting bellows 51 by tubes 97, 98, with the vacuum chamber of valve box 81 when perforation 94 registers with duct 95. Bellows 51 will thus collapse to couple driving shaft 44 to roller 27, in the manner described, thereby rewinding the record.

In order to stop rewinding after record 29 has been sufficiently coiled around roller 27 to permit the rendition of the first air embodied on said record, an additional perforation 99 is provided in record 29 which is arranged slightly in front of the beginning of the first air. This perforation is adapted to register with a duct 100 of the tracker bar, which is, by tube 101, connected with a set of primary and secondary valves arranged in extension 82 of valve box 81. The primary valve plays in a vacuum chamber $87^a$, while the secondary valve connects bellows 68 through tubes 102, $102^a$, $102^b$ with vacuum chamber $88^a$, when perforation 99 registers with duct 100. Bellows 68 will thus collapse to withdraw hook 64 from lever 50 and recouple driving shaft 44 to drum 28, as above described.

During the entire rewinding operation, the tune producing bellows $77^a$, and the switch-actuating bellows 91 should be rendered inoperative in order to prevent the sounding of notes and prevent the arrest of the rewinding operation when perforations 77 and 78 pass over the corresponding tracker bar ducts. For this purpose, duct 95, besides being operatively connected to bellows 51, is connected to means for severing the pneumatic action of bellows $77^a$ and 91, from pump 73, while on the other hand duct 100, besides being operatively connected to bellows 68, returns said means into their original position for reconnecting the pneumatic action of bellows $77^a$ and 91 to the vacuum pump.

In order to arrest the record after drum 28 has been recoupled to driving shaft 44, in the manner described and before the first air is played, a perforation 78 is provided intermediate perforation 99 and said first air. If this perforation 78 registers with duct 79, bellows 91 will be collapsed to open the switch of the electromotor and thus arrest the instrument.

For rewinding the record before all the music pieces have been played, a valve 103 is provided, said valve having an air inlet duct 104 and an air outlet duct 105, which ducts may be connected by an angular duct 106 of a plug 107. Duct 105 communicates by tube 108, with tube 96, so that by opening valve 103, the same result will be obtained as was produced by the registration of perforation 94 with duct 95, i. e., the record will be rewound.

For completely rewinding the record and disengaging the same from hook 38, a valve 109 is provided between tubes $102^a$, $102^b$. When this valve is closed, the uncovering of duct 100, by perforation 99, is rendered ineffective, so that bellows 68 cannot collapse. In this way the rewinding will be continued until ring 39 slips off hook 38, so that the record may be readily exchanged.

Pump 73, hereinabove referred to, comprises essentially three bellows 110, each having a lower fixed board 111, channeled as at 112, and an upper movable board 113. The openings 114, which connect channels 112 with the bellows, are controlled by a leather flap 115, while the perforations 116 of the movable boards are controlled by flaps 117. To each movable board 113 is secured a rod 118, the upper end of which is bent, as at 119. The crank pins 120 of shaft 72 are straddled by a pair of spaced blocks 121 held to arm 119 by screws 122. Between the heads of these screws and lower block 121, there are interposed springs 123 which yieldingly hold blocks 121 to crank pins 120, so that all undesirable rattling of the pump is avoided, even after said pins and blocks are partly worn out.

Channels 112 communicate with an upright duct 124 that opens into a main vacuum chamber 125 of a box 126. In order to maintain a uniform vacuum within said chamber, a pair of communicating compensation bellows 127, 128 are provided. These bellows are normally spread by springs 129, 130, respectively, of which spring 130 is somewhat stronger than spring 129. The outer board 131 of bellows 128 is provided with a perforation 132 which is controlled by a flap valve 133 influenced by springs 134. From valve 133 projects upward an arm 135 carrying an adjustable button 136 which is adapted to abut against box 126. If, during play, the vacuum becomes excessive, bellows 127 will first collapse. If the collapse of these bellows is not sufficient to compensate for the high vacuum, bellows 128 will also collapse, until finally button 136 bears against box 126 and thereby opens flap valve 133 to admit air into bellows 128.

The means for automatically disconnecting the pneumatic action of the tune producing bellows, etc., while rewinding the record, are as follows: To box 126 there is secured, by suitable brackets, duplex bellows 137, 138 which are separated by a common movable board 139. The latter is provided with an eye 140 which is engaged by rod 141 adjustably held to the eye by a pair of nuts 142. This rod passes through a perforation of box 126 into a chamber 143 thereof and is secured, at its inner end, to a slide valve 144. The latter is influenced by a spring 145 and controls an opening 146 that connects main vacuum chamber 125 with valve chamber 143. This valve chamber communicates through a pair of openings 147, 148, with a second valve chamber 149. From the latter there lead a pair of tubes 150, 151 to the ends of valve box 82, thus establishing communication between the vacuum chambers of the primary and secondary valves of the pneumatic action and chamber 149. The vacuum chambers 87$^a$, 88$^a$ of extension 82, are, by duct 152 and tube 153, connected with main vacuum chamber 125. Bellows 137 is, by tube 154, connected to tubes 102, 102$^a$, while bellows 138 is, by tube 155, connected to tubes 97, 98. It will be seen that when bellows 51 are collapsed, owing to the registration of perforation 94 with duct 95, bellows 138 will also be collapsed to close opening 146 by valve 144. In this way tubes 150, 151 are cut off from the main vacuum chamber 125, so that the tune producing bellows 77$^a$ and the stop bellows 91 are rendered inoperative, while vacuum chambers 87$^a$, 88$^a$ remain in communication with the main vacuum chamber 125 through tube 153. When perforation 99, of record 29, registers with duct 100, bellows 68, as well as bellows 137, will be collapsed, to stop the rewinding operation and to simultaneously collapse bellows 137, thereby opening valve 144. In this way bellows 77$^a$ and 91 are reconnected to the main vacuum chamber 125, as will be readily understood.

The instrument is so constructed that for soft playing, the main vacuum chamber is partly cut off the action bellows, so as to reduce the force of the hammer stroke, while simultaneously raising the hammer rail. For playing pianissimo, the vacuum is still decreased to further reduce the force of the hammer stroke. The means for producing this result are as follows: The ports 147, 148, between vacuum chambers 143 and 149, are controlled by spring-depressed valves 156, 157, to which rods 158, 159 are respectively secured. Rod 158 is adjustably connected to a finger 160 projecting upward from the movable board of a vacuum reducing bellows 161 which is normally distended by a spring 162. In like manner, rod 159 is adjustably connected to a finger 163 projecting upward from the movable board of a regulating bellows 164 which is normally distended by springs 165. The force of springs 165 exceeds that of spring 162, so that bellows 161 will collapse prior to the collapse of bellows 164. Finger 160 is adapted to move along a notched arm 166 secured to the movable board of trip bellows 167 which is normally distended by a spring 168. The hammer rail 169 of the piano action is pivoted to the frame by arms 170, as usual. One end of said rail is, by a link 171, connected to the movable board of bellows 172, said board carrying an upwardly extending cushioned finger 173. This finger is adapted to engage the shoulder 174 of a lever 175 pivoted as at 176. The free end of this lever rests upon a plate 177 projecting from the movable board of trip bellows 178.

Bellows 161, 167, 172 and 178 are actuated in the following manner: In addition to the perforations described, record 29 is provided with two rows of perforations 179, 180. Of these, perforations 179 are provided in the record wherever it is desired to play softly. The instrument continues such soft play until one of the perforations 180 is reached, which causes the instrument to resume the forte play. Perforations 179, 180 are adapted to register, respectively, with ducts 181, 182 of tracker bar 40. Duct 181 is, by tube 183, connected to a set of primary and secondary valves of box 81, the secondary valve connecting its vacuum chamber through tubes 184, 184$^a$ and 184$^b$, with bellows 172, 161, respectively. Duct 182 is, by tube 185, connected to a set of primary and secondary valves, the secondary valve connecting its vacuum chamber with bellows 178, 167 through tubes 186, 186$^a$ and 186$^b$, respectively. When a perforation 179 registers with duct 181, bellows 161 and 172 will be simultaneously collapsed, as will be readily understood. During the collapse of bellows 161, finger 160 will enter the first notch 187 of arm 166 to become temporarily locked in this position. Valve 156 will thus be advanced to partly close passage 147, so that the vacuum in the action bellows will be lowered, thereby reducing the force of the hammer stroke. Through the collapse of bellows 172, the hammer rail 169 is raised to reduce the stroke of the hammers, rail 169 being maintained in its raised position owing to the engagement of finger 173 with shoulder 174 of lever 175. When a perforation 180 subsequently registers with duct 182, trip bellows 167, 178 will be simultaneously collapsed. Arm 166 will thus be withdrawn from finger 160 to permit the expansion of bellows 161, while plate 177 lifts lever 175, thereby permitting hammer rail 169 to return to its original position.

Whenever it is desired to play pianissimo instead of forte, the above described perforations 179, 180 are made of equal lengths and are arranged so as to slightly overlap, perforation 180 being provided slightly in advance of perforation 179. (Fig. 18$^a$.) Trip bellows 167 will thus be collapsed prior to the collapse of bellows 161, so that finger 160 will pass over notch 187 and will engage the second notch or shoulder 188 of arm 166. As bellows 167, 178 are expanded before bellows 161, 172 could expand, the latter will be locked in their collapsed state by notch 188 and shoulder 174, respectively. In this way, valve 156 will be entirely closed, the air being permitted to be withdrawn through port 148 only. The area of said port is controlled by valve 157, which, by being actuated through regulating bellows 164, insures the maintenance of a uniform low vacuum.

For changing the expression from piano into pianissimo, a pair of perforations 179, 180 follows the perforation 179 which previously caused the expression forte to be changed into piano. Of this pair, perforation 180 should terminate slightly in advance of perforation 179, so that trip bellows 167, 178 arrive at their locking position before bellows 161, 172 are permitted to expand.

It will be seen that by the construction described, a coin-controlled autopneumatic piano is endowed with all the advantages flowing from the use of a double ended music sheet, and that the separate airs contained on said sheet may be consecutively rendered without necessitating any manipulation between the last and the first air. In this way the length of the music sheet may be greatly increased over that of the endless sheets heretofore generally employed in instruments of the class described, to obtain a corresponding increase of the number of airs and avoid any monotony owing to a frequent repetition of the same airs.

I claim:

1. In an instrument of the class described, a delivery roller, a receiving drum, a record engaging said roller and drum, a driving shaft, a first bellows controlled by the record, means operable by said first bellows for coupling the driving shaft to the delivery roller, a second bellows also controlled by the record, and means operable by said second bellows for releasing the means for coupling the driving shaft to the receiving roller.

2. In an instrument of the class described, a delivery roller, a first gear wheel, a speed increasing gear intermediate said wheel and roller, a receiving drum, a second gear wheel secured thereto, a record engaging the roller and drum, a driving shaft, a first pinion secured thereto, a lever loosely engaging the driving shaft, a second pinion carried by said lever and intergeared with the first pinion, said second pinion being adapted to separately engage the first and second gear wheels, a spring-influenced bellows controlled by the record and operably connected to the lever, and a trip bellows also controlled by the record and engaged by the lever.

3. In an instrument of the class described, a record, a vacuum pump, first vacuum chambers adapted to communicate therewith, primary and secondary valves coöperating with said vacuum chambers, hammer-actuating bellows and a stop bellows controlled by said valves, second vacuum chambers permanently communicating with the pump, a primary valve and a secondary valve coöperating with said second vacuum chambers, a rewinding bellows controlled by said last-named primary and secondary valves, and means controlled by the tune sheet for collapsing the rewinding bellows and for simultaneously interrupting communication between the pump and the first vacuum chambers.

4. In an instrument of the class described, a record, a main vacuum chamber, hammer-actuating bellows and a stop bellows, a slide valve controlling communication between the main vacuum chamber and all of said bellows, a rewinding bellows, and means controlled by the record for simultaneously closing the slide valve and collapsing the rewinding bellows.

5. In an instrument of the class described, a record, a main vacuum chamber, hammer-actuating bellows and a stop bellows, a slide valve controlling communication between the main vacuum chamber and all of said bellows, a duplex bellows operably connected to the slide valve, a rewinding bellows, and means controlled by the record for simultaneously actuating the duplex bellows and the rewinding bellows.

6. In an instrument of the class described, a record, a main vacuum chamber, hammer-actuating bellows and a stop bellows, a slide valve controlling communication between the main vacuum chamber and all of said bellows, a rewinding bellows, a trip bellows operably connected to the rewinding bellows, means controlled by the record for closing the slide valve and collapsing the rewinding bellows, and means also controlled by the record for opening the slide valve and collapsing the trip bellows.

Signed by me, at St. Johnsville, N. Y., this 14th day of March, 1910.

ADAM J. HOBART.

Witnesses:
 EDWARD R. HALL,
 DAVID CROUSE.